United States Patent
Liu et al.

(10) Patent No.: US 7,907,528 B2
(45) Date of Patent: Mar. 15, 2011

(54) MANAGING POWER CONSUMPTION IN A NIC TEAM

(75) Inventors: Wei Liu, Austin, TX (US); Lei Wang, Austin, TX (US); Jianwen Yin, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 410 days.

(21) Appl. No.: 11/554,015

(22) Filed: Oct. 28, 2006

(65) Prior Publication Data

US 2008/0101230 A1    May 1, 2008

(51) Int. Cl.
*H04J 1/16* (2006.01)
(52) U.S. Cl. .................. 370/235; 370/252; 370/254
(58) Field of Classification Search .......... 370/468, 370/216, 254, 230
See application file for complete search history.

(56) References Cited

U.S. PATENT DOCUMENTS

| 6,567,377 | B1 * | 5/2003 | Vepa et al. | 370/230 |
| 6,590,861 | B1 * | 7/2003 | Vepa et al. | 370/216 |
| 2005/0198257 | A1 | 9/2005 | Gupta et al. | |
| 2006/0029097 | A1 | 2/2006 | McGee et al. | |
| 2006/0034190 | A1 * | 2/2006 | McGee et al. | 370/254 |

* cited by examiner

*Primary Examiner* — Albert T Chou
(74) *Attorney, Agent, or Firm* — Garrana Tran LLP; Andrea E. Tran

(57) ABSTRACT

The present disclosure provides an information handling system which includes a team of network interface controllers (NIC), each controller operable to receive network traffic load. The system also includes logic configured to direct the network traffic load to at least one NIC in the team based on the network traffic load. The present disclosure may result in overall power savings for system.

17 Claims, 4 Drawing Sheets

```
200 — Receiving Communication Regarding Traffic Load

210 — Directing Traffic Load
```

MANAGING POWER CONSUMPTION IN A NIC TEAM

BACKGROUND

1. Technical Field

The present disclosure relates generally to information handling systems and, more particularly, to network interface controllers (NICs).

2. Background Information

As the value and use of information continues to increase, individuals and businesses seek additional ways to process and store information. One option available to users is an information handling system. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Network interface controllers (NICs) provide physical connections to allow information handling systems (IHSs) to communicate over a network. NIC teaming, a technology used to group two or more NICs together as a single virtual adapter to the outside world, generally provides fault tolerance and link aggregation. Generally, NIC teaming mode treats each team member with equal preference, therefore resulting in loads which are usually evenly balanced among multiple members. Furthermore, in NIC teaming mode, all team members may be kept in high-powered states even during times when network traffic is not heavy, such as during night mode.

Alternatively, one or multiple NIC team members may be switched to low-powered or power-saving states while they are not in use, thereby directing loads to one NIC or a subset of NIC team members. The de-selection of individual NIC team members during light network traffic may result in significant overall power savings and provide possible environmental benefits.

SUMMARY

The following presents a general summary of some of the many possible embodiments of this disclosure in order to provide a basic understanding of this disclosure. This summary is not an extensive overview of all embodiments of this disclosure. This summary is not intended to identify key or critical elements of the disclosure or to delineate or otherwise limit the scope of the claims. The following summary merely presents some concepts of the disclosure in a general form as a prelude to the more detailed description that follows.

In one embodiment, an information handling system including a team of network interface controllers (NIC) is disclosed. Each controller may be operable to receive network traffic load. The system may also include logic configured to direct the network traffic load to at least one NIC in the team based on the network traffic load.

In an alternative embodiment, a method for managing power consumption in a NIC team is disclosed. The method may include receiving communication indicative of network traffic load from the NIC team and directing the network traffic load to at least one NIC in the team based on the traffic load.

In yet another non-limiting embodiment, a computer-readable medium having stored thereon executable instructions for performing a method for managing power consumption in a NIC team is disclosed. The medium may include instructions for receiving communication indicative of network traffic load from the NIC team and directing network traffic load to at least one NIC in the NIC team.

BRIEF DESCRIPTION OF THE DRAWINGS

The following drawings illustrate some of the many possible embodiments of this disclosure in order to provide a basic understanding of this disclosure. These drawings do not provide an extensive overview of all embodiments of this disclosure. These drawings are not intended to identify key or critical elements of the disclosure or to delineate or otherwise limit the scope of the claims. The following drawings merely present some concepts of the disclosure in a general form. Thus for a detailed understanding of this disclosure, reference should be made to the following detailed description, taken in conjunction with the accompanying drawings, in which like elements have been given like numerals.

DETAILED DESCRIPTION

For purposes of this disclosure, an embodiment of an Information Handling System (IHS) may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an IHS may be a personal computer, a network storage device, or any other suitable device and may vary in size, shape, performance, functionality, and price. The IHS may include random access memory (RAM), one or more processing resources such as a central processing unit (CPU) or hardware or software control logic, ROM, and/or other types of nonvolatile memory. Additional components of the IHS may include one or more disk drives, one or more network ports for communicating with external devices as well as various input and output (I/O) devices, such as a keyboard, a mouse, and a video display. The IHS may also include one or more buses operable to transmit data communications between the various hardware components.

Portions of the present disclosure, detailed description and claims may be presented in terms of logic, software or software implemented aspects typically encoded on a variety of media including, but not limited too, computer-readable media, machine-readable media, program storage media or computer program product. Such media may be handled, read, sensed and/or interpreted by an information handling system (IHS). Those skilled in the art will appreciate that such media may take various forms such as cards, tapes, magnetic disks (e.g., floppy disk or hard drive) and optical disks (e.g., compact disk read only memory ("CD-ROM") or digital versatile disc ("DVD")). It should be understood that the given implementations are illustrative only and shall not limit the present disclosure.

Figure 1:
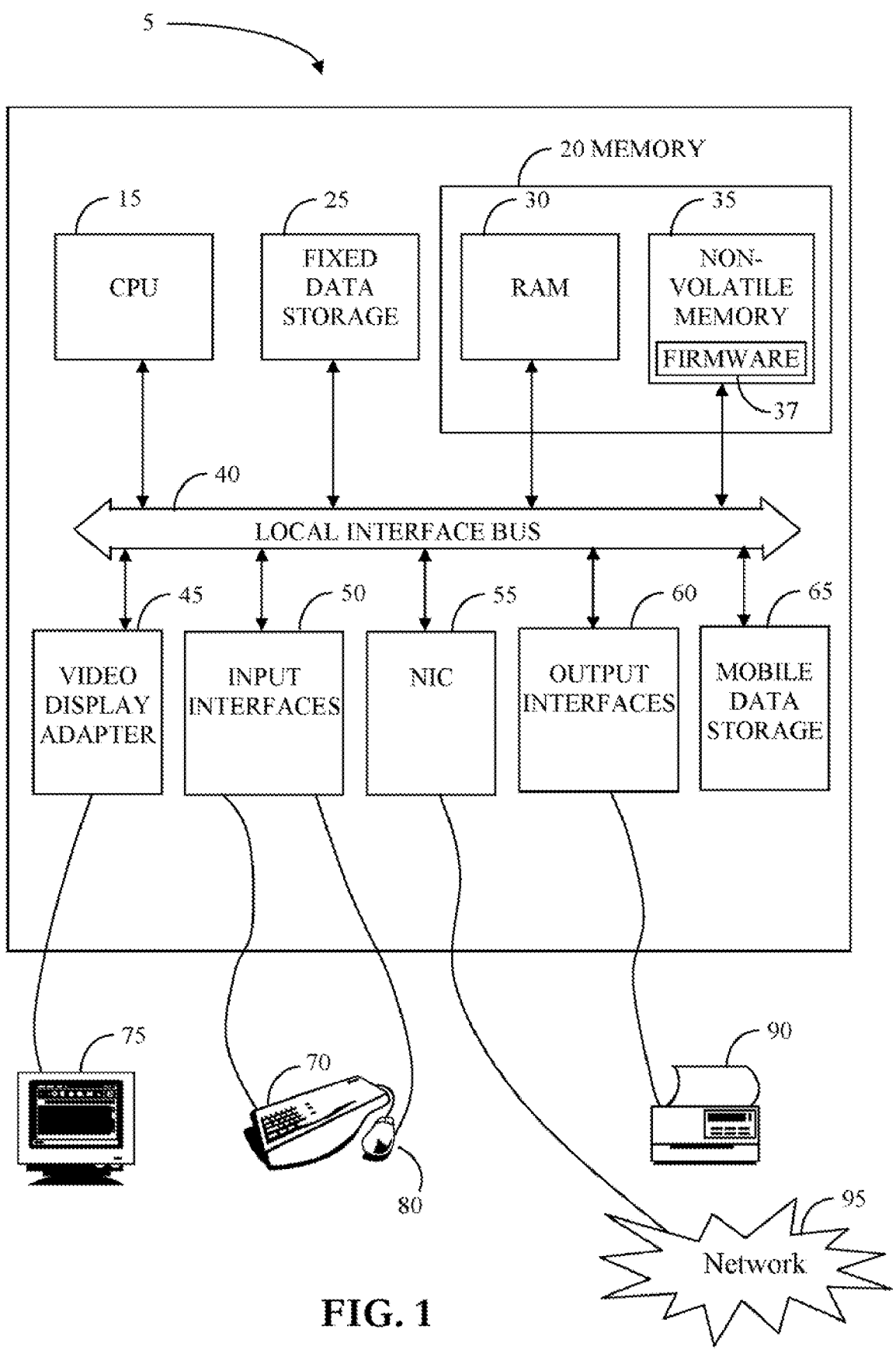
FIG. 1 is a block diagram illustrating an information handling system (IHS).

FIG. 1 illustrates a non-limiting embodiment of an information handling system 5 comprising a CPU 15. It should be understood that this disclosure has applicability to information handling systems as broadly described above, and is not intended to be limited to IHS 5 as specifically described. The CPU 15 may comprise a processor, a microprocessor, minicomputer, or any other suitable device, including combinations and/or a plurality thereof, for executing programmed instructions. The CPU 15 may be in data communication over a local interface bus 40 with fixed data storage 25, mobile data storage device 65 and memory 20.

The memory 20, as illustrated in FIG. 1 includes a non-volatile memory 35 having a firmware program 37 optionally stored therein, such as an initialization start-up program. The non-volatile memory 35 includes, but is not limited to flash memory and electrically erasable programmable read-only memory (EEPROM). The firmware program 37 may contain, programming and/or executable instructions required to control a keyboard 70, a display monitor 75, a mouse 80, a mobile data storage 65, other input/output devices not shown here and a number of miscellaneous functions and/or devices. The memory 20 may also comprise a random access memory (RAM) 30. The OS and application programs may be loaded into RAM 30 for execution.

The IHS 5 may further comprise a video display adapter 45, a plurality of input interfaces 50, a network interface controller (NIC) 55, and a plurality of output interfaces 60. Output interface 60 may transmit data to printer 90 for printing.

The IHS 5 may be coupled to a network 95 through the network interface controller (NIC) 55 thus allowing the IHS 5 to send and receive data via the network 95 to and from a remote device. A NIC 55 may also allow multiple information handling systems to communicate over a network 95 such as a local area network (LAN). As used herein, a network interface controller may also be referred to as a network interface card or network adapter. The NIC 55 may be an Ethernet controller, however, those skilled in the art will appreciate that a plurality of brands or types of controllers, cards and/or adapters may be utilized.

Figure 2:
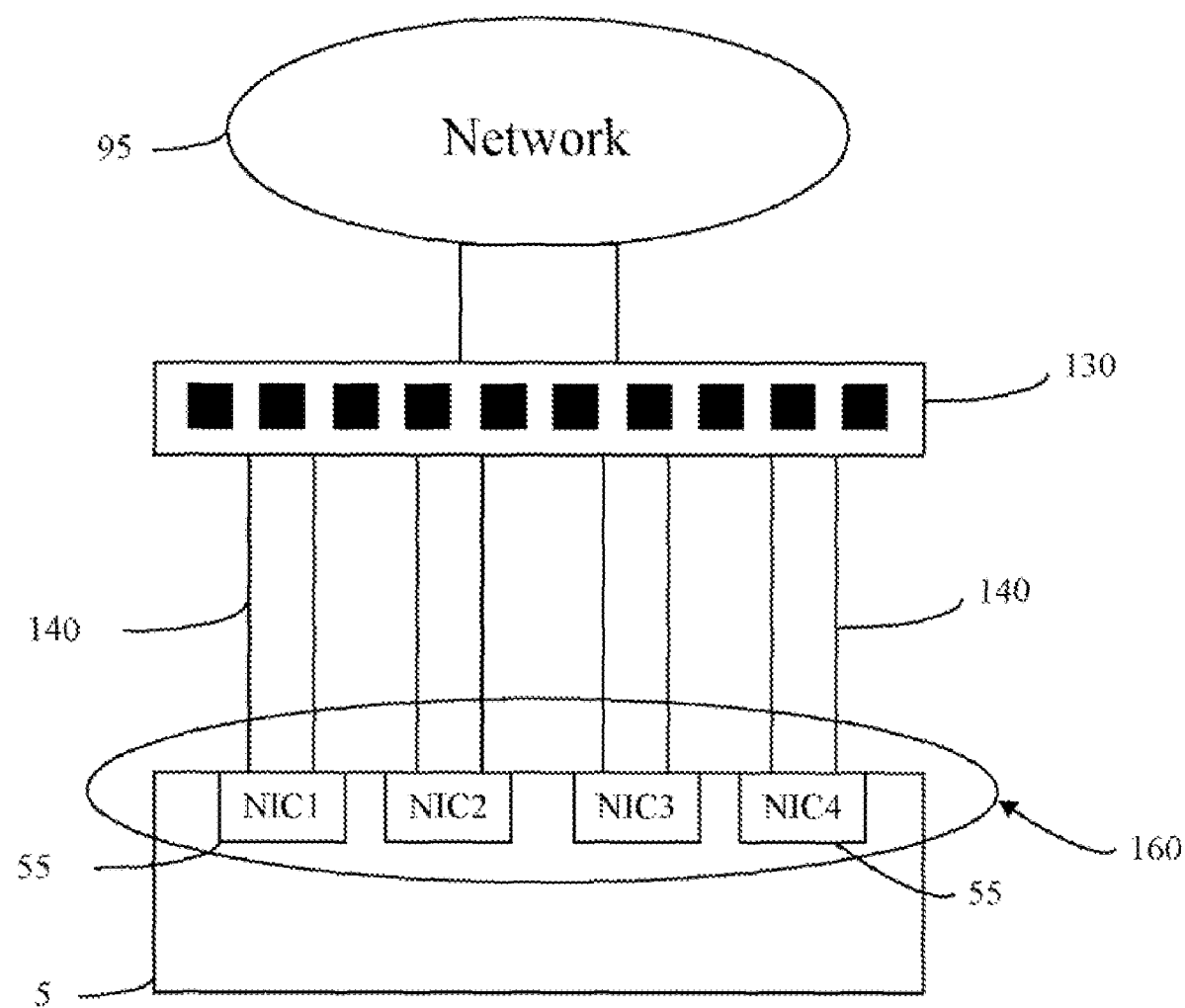
FIG. 2 is a block diagram illustrating an information handling system (IHS) with a network interface controller (NIC) team.

Referring to FIG. 2, an information handling system (IHS) 5 with a network interface controller (NIC) team 160 is illustrated, in accordance with one embodiment of the present disclosure. As used herein, a "NIC team" may refer to a grouping of two or more physical NICs 55 into a single virtual interface or single logical network device (not shown). NIC teaming may allow high-speed and efficient transfer of network data and/or packets among the individual physical NICs 55. NIC teaming may also provide link aggregation and fault tolerance for an overall network connection in the case of a single point of failure for any single physical NIC 55. In alternative embodiments, a NIC team 160 may be operable as an Ethernet trunk, port team, port trunk, NIC bond and link aggregate group (LAG) and may be based on one or more of the IEEE 802 networking standards and/or protocols.

Individual NICs 55 or a NIC team 160 generally operate to receive network traffic 140 in the form of network data and/or packets. In one embodiment, network traffic 140 may be bidirectional and incoming toward the NICs 55 or outgoing toward the network 95.

NICs 55 may occupy a range of varying power states. NICs support the Advanced Configuration and Power Interface (ACPI) specification by implementing power management related features including, but not limited to, D0-D3 states and wakeup capabilities. The D0 state may indicate that a device (e.g., NIC) is on or in an enabled operating state. Alternatively, the D3 state may indicate that the device is off or in a disabled operating state. It is understood that there may also exist other states or intermediates indicating various operating states of a device.

As used herein, enabling or waking-up a device may refer to placing the device in any power state other than D3. Depending on the type of device or operation desired, D0, D1 and D2 may indicate enabled or wake-up states. Alternatively, as used herein, placing a device in a low power state or sleep mode may indicate that a device is in a D3 state.

Continuing with FIG. 2, logic 130 may be configured to receive and/or process communication regarding network traffic load 140. Logic 130 may comprise hardware and/or software (e.g., driver). In non-limiting embodiments, logic 130 may comprise software including, but not limited to, operating system power management software (OSPM). Based on the communication received, the logic 130 may balance the network traffic load 140 among the individual NICs 56 in the NIC team 160. The communication received and/or processed by logic 130 may include various types of information including, but not limited to, the amount of network traffic and/or a predetermined level of network traffic. It should be recognized that the present disclosure does not depend on any predetermined level as this level may be user defined. The amount of network traffic or network traffic load may vary depending on factors including, but not limited to, the time of day or day of the year. For example, logic 130 may receive a low network traffic load 140 during night mode.

Figure 3:
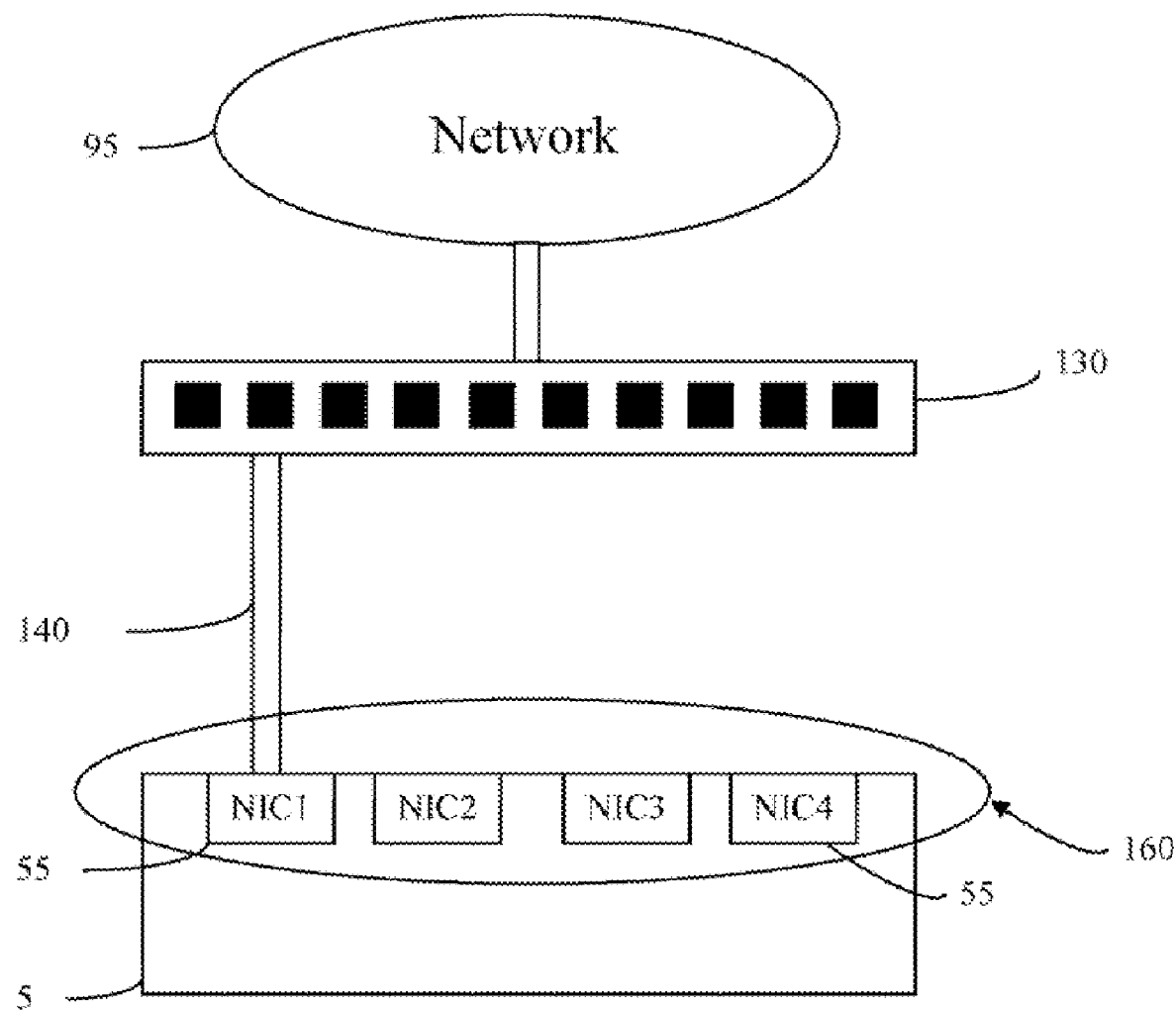
FIG. 3 is a block diagram illustrating an IHS with a NIC team utilizing a power consumption management system.

Referring now to FIG. 3, in accordance with one possible embodiment, logic 130 may receive communication and re-balance the network traffic load 140 by directing such load 140 to a single NIC 55 or a subset of NICs when there is light network traffic load. As illustrated in FIG. 3, network traffic 140 is directed to one NIC 55, however, it is understood that the network traffic 140 may be directed to any number of NICs 55 provided that the number is less than the total number of NICs in the team. In one illustrative embodiment, the NIC team 160 may comprise 2, 4, 8 or 16 individual NICs 55. However, it is understood that the number of NICs 55 in a NIC team 160 may be any number. In the event that all network traffic load 140 is directed or assigned to a single NIC 140, it may be referred to as a primary controller or primary adapter. In an alternative embodiment, logic 130 may receive communication and re-balance the network traffic load 140 by directing such load 140 to a single NIC 55 or a subset of NICs when the network traffic load falls below a user-defined predetermined level.

In another aspect of FIG. 3, the logic 130 may place NICs 55 that are not assigned network traffic load 140 to low power states (e.g., sleep or D3 states). Once the network traffic load 140 increases and exceeds a user-defined predetermined level, the logic 130 may wake up or enable a single NIC 55 and assign network traffic loads to it. In yet another non-limiting aspect, the logic 130 may wake up or enable a subset of NICs 55 and assign network traffic loads 140 to them.

Figure 4:
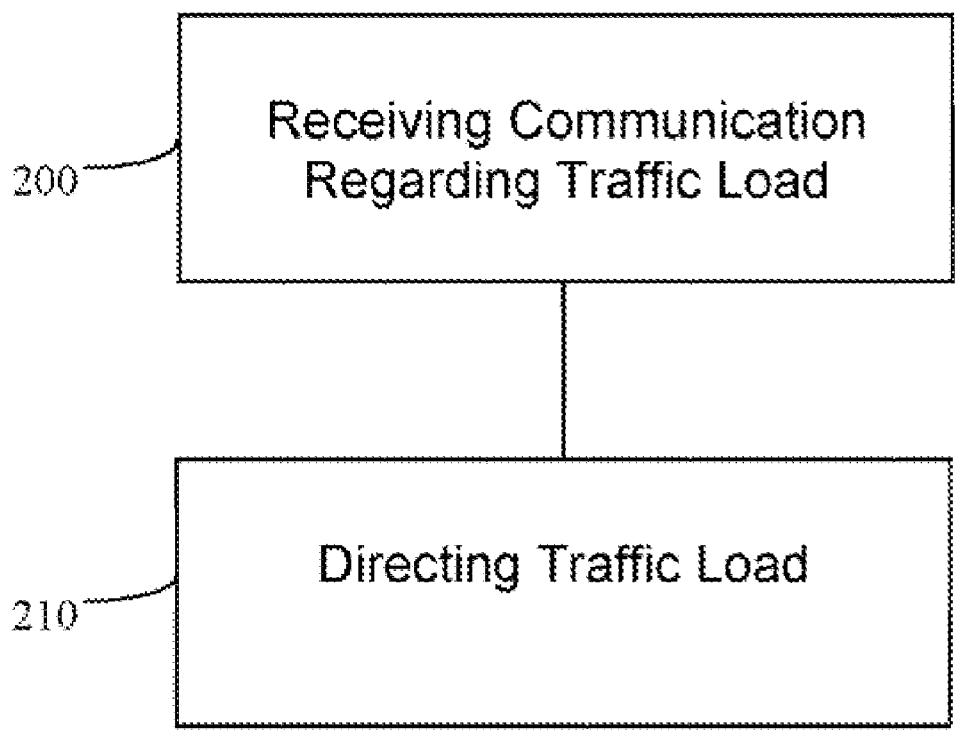
FIG. 4 is a flowchart illustrating one aspect of power consumption management for NIC teams.

FIG. 4 conceptually illustrates one aspect of power consumption management for NIC teams. In an illustrative method for managing power consumption in a NIC teams the method may comprise the step 200 of receiving communication indicative of network traffic load from the NIC team. The method may also comprise the step 210 of directing the network traffic load to at least one NIC in the team. Referring back to FIG. 3, logic 130 may receive the communication and/or may direct network traffic 140 to at least one NIC 55 in the team 160. It is understood that the network traffic 140 may be directed to any number of NICs 55 provided that the number is less than the total number of NICs in the team. In the example of a NIC team comprising 4 individual NICs, the network traffic toad may be assigned to 1, 2 or 3 NICs in the team.

Calculated data from an illustrative operating example demonstrates that systems and/or methods described in the present disclosure may produce a 49.4% savings on NIC energy cost. In an illustrative example utilizing Intel 82546 GB/EB Gigabit NICs, the power consumption may be 4.1 W in a D0 state and 1.4 W in a D3 state. In a team of four 82546 GB/EB Gigabit NICs at night mode, 8.1 W can be saved if all loads are put on a single NIC with the remaining three NICs are in D3 states.

Furthermore, systems, methods, and/or media of the present disclosure, detailed description and claims may be presented in terms of logic, software or software implemented aspects typically encoded on a variety of media or medium including, but not limited to, computer-readable medium/media, machine-readable medium/media, program storage medium/media or computer program product. Such media, having computer executable instructions, may be handled, read, sensed and/or interpreted by an information handling system. Generally, computer-executable instructions, such as program modules, may include routines, programs, objects, components, data structures, and the like, which perform particular tasks, carry out particular methods or implement particular abstract data types. Those skilled in the art will appreciate that such media may take various forms such as cards, tapes, magnetic disks (e.g., floppy disk or hard drive) and optical disks (e.g., compact disk read only memory ("CD-ROM") or digital versatile disc ("DVD")). It should be understood that the given implementations are illustrative only and shall not limit the present disclosure.

While various embodiments have been shown and described, various modifications and substitutions may be made thereto without departing from the spirit and scope of the invention. Accordingly, it is to be understood that the present invention has been described by way of illustrations and not limitation.

What is claimed is:

1. An information handling system comprising:
  a team of network interface controllers (NIC), each controller operable to receive network traffic load, wherein the network traffic load is evenly balanced among each NIC of the team of network interface controllers (NICs); and
  logic configured to receive information associated with an amount of network traffic and direct the network traffic load to a subset of NICs in the team based on the amount of network traffic, wherein the logic is further configured to de-select at least one NIC of the team of NICs by placing the at least one NIC in a low power state when the amount of network traffic falls below a user-defined level and wherein the logic is further configured to evenly balance the network traffic load among the NICs within the subset other than the at least one NIC in the low power state.

2. The system of claim 1, wherein the logic is configured to receive communication indicative of the network traffic load and the amount of network traffic.

3. The system of claim 1, wherein the logic directs the network traffic load to a primary controller.

4. The system of claim 1, wherein the logic directs the network traffic load to less than all of the NICs.

5. The system of claim 1, wherein the team of NICs may comprise an Ethernet controller.

6. The system of claim 1, wherein the logic comprises operating system power management software (OSPM).

7. The system of claim 1, wherein the logic is further configured to place less than all of the NICs in a low power state when the amount of network traffic falls below the user-defined level.

8. The system of claim 1, wherein the logic is further configured to enable the at least one NIC from a low power state to a higher power state when the amount of network traffic exceeds the user-defined level.

9. The system of claim 8, wherein the logic is further configured to assign the network traffic load to at least one NIC in the higher power state.

10. A method for managing power consumption in a network interface controller (NIC) team, the method comprising:
  receiving communication from the NIC team indicative of a network traffic load and an amount of network traffic, wherein the network traffic load is evenly balanced among each NIC of the NIC team;
  directing the network traffic load to a subset of network interface controllers (NICs) in the NIC team based on an amount of network traffic;
  de-selecting at least one NIC of the team of NICs by placing the at least one NIC in a low power state when the amount of network traffic falls below a user-defined level; and
  evenly balancing the network traffic load among the NICs within the subset other than the at least one NIC in the low power state.

11. The method of claim 10, wherein the step of directing the network traffic load further comprises assigning the network traffic load to less than all of the NICs.

12. The method of claim 10, wherein the step of directing the network traffic load further comprises enabling the at least one NIC from a low power state to a higher power state when the amount of network traffic exceeds the user-defined level.

13. The method of claim 12, wherein the step of enabling the at least one NIC further comprises assigning the network traffic load to the at least one NIC in the higher power state.

14. A computer-readable medium having stored thereon executable instructions for performing a method for managing power consumption in a network interface controller (NIC) team, the medium comprising:
  a first instruction for receiving communication from the NIC team indicative of a network traffic load and an amount of network traffic;
  a second instruction for directing the network traffic load to a subset of network interface controllers (NICs) in the NIC team based on an amount of network traffic, wherein the network traffic load is evenly balanced among the NICs within the subset;
  a third instruction for de-selecting at least one NIC by placing the at least one NIC in a low power state when the amount of network traffic falls below a user-defined level; and a fourth instruction for evenly balancing the network traffic load among the subset of NICs in the team other than the at least one NIC in the low power state.

15. The computer-readable medium of claim 14, wherein the instruction for directing network traffic load further comprises an instruction for assigning the network traffic load to less than all of the NICs.

16. The computer-readable medium of claim 14, wherein the instruction for directing the network traffic load further comprises an instruction for enabling the at least one NIC from a low power state to a higher power state when the amount of network traffic exceeds the user-defined level.

17. The computer-readable medium of claim 16, wherein the instruction for enabling the at least one NIC further comprises an instruction for assigning the network traffic load to at least one NIC in the higher power state.

* * * * *